Dec. 9, 1941.    J. R. LAWRENCE    2,265,533
BEATER
Filed Sept. 26, 1939    2 Sheets-Sheet 1

Inventor:
John Richard Lawrence
By
Owen W. Kennedy
Attorney

Dec. 9, 1941.                J. R. LAWRENCE                2,265,533
                                 BEATER
                           Filed Sept. 26, 1939              2 Sheets-Sheet 2

Inventor:
John Richard Lawrence

Patented Dec. 9, 1941

2,265,533

UNITED STATES PATENT OFFICE 2,265,533

BEATER

John Richard Lawrence, Worcester, Mass., assignor to The Washburn Company, Worcester, Mass., a corporation of Massachusetts Application September 26, 1939, Serial No. 296,631

4 Claims. (Cl. 259—121)

The present invention relates to a beater for mixing foods within an associated bowl, the beater being adapted particularly for whipping or beating liquids, such as cream and eggs.

The principal object of the present invention is to mount the beater and a cover for the bowl as a single unit in such a way that pressure on the handle will hold the beater element in the lowermost portion of the bowl and will hold the cover in place on the bowl. In this way any splashing of the material being whipped or beaten is prevented and at the same time the beater element is close enough to the bottom of the bowl to assure a complete beating of the material.

A further feature of the invention resides in the use of a substantially cup-shaped beater element mounted to rotate on its axis, with this axis inclined slightly from the vertical. This element preferably is perforated to assure thorough and complete beating of the material in the bowl.

Other and further objects and advantages of the invention will more fully appear from the following detailed description taken in connection with the accompanying drawings in which—

Figure 2:
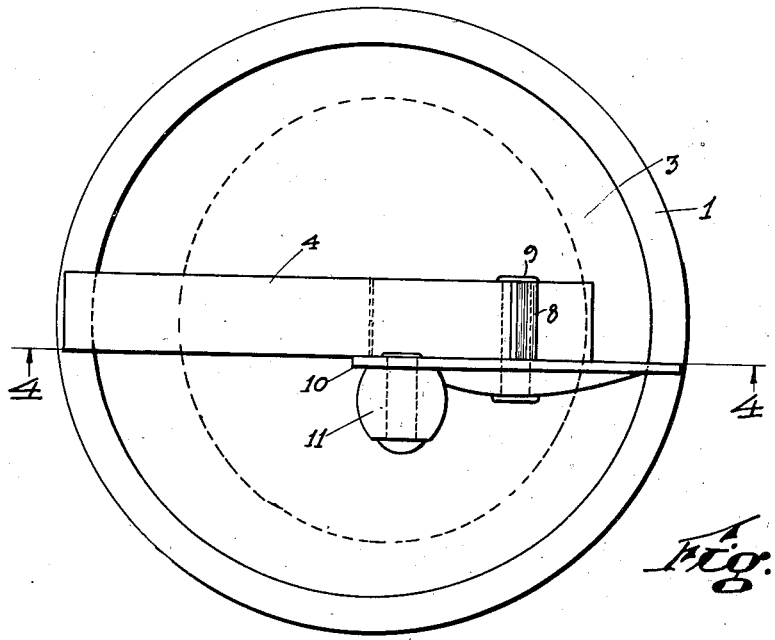
Fig. 2 is a plan view of the device of Fig. 1.

With reference to the drawings, a bowl 1 has a groove 2 in its upper edge in which fits a circular cover 3. The cover is preferably slightly arcuate in cross-section, as shown, and has mounted thereon a handle 4 which supports the cup-shaped beater element 5. The handle 4 is secured to the cover adjacent one edge thereof and extends upwardly and over the cover, having a free downwardly projecting end 6. Suitably fastened to the end 6 of the handle is a member 7 which cooperates with the end 6 to provide a bearing 8 for the horizontal shaft 9 on which the driving element 10 for the beater is mounted. The element 10 has a handle 11 adjacent its periphery and is also provided with a circular row of openings 12 for engagement with a pinion 13 on the shaft 14 that supports the beater element 5. The member 7 and the end 6 of the handle 4 provide a bearing 15 for the upper end of the shaft 14 and the lower end of the member 7 extends downwardly into the bowl 1 where it has a laterally projecting arm 16 providing a bearing for the shaft 14 adjacent to the beater element. A flange 17 on the shaft supports the latter against movement endwise through the arm 16 and thus holds the pinion in proper relation to the driving element 10.

The member 7 extends around the pinion 13 and downwardly through an opening 18 in the cover, through which the shaft 14 also projects. Adjacent to and above the cover, the member 7 has an offset 19, in the form of an outwardly bent portion engageable with the upper surface of the cover, thereby serving to positively maintain the beater element a predetermined distance above the bottom of the bowl 1. It will be noted that the cover and beater may be removed from the bowl as a unit merely by lifting on the handle 4. When the cover and beater element are placed on the bowl a slight downward pressure on the handle will hold the cover in place on the bowl and will position the beater element with respect to the bottom of the bowl, the downward movement of the beater element being limited as above stated, by the offset or stop 19 on the member 7.

The beater element 5 is cup-shaped and the shaft 14 is connected to the beater element in such a manner that a rotation of the shaft will cause a rotation of the beater element on its own axis. Thus, in the construction shown, the shaft 14 is secured centrally to the beater element and extends upwardly therefrom on a line coinciding with the axis of the beater element. The beater element itself is perforated to provide a large number of relatively large openings 20 therethrough, the number and size of the perforations being substantially as large as possible without weakening the element excessively.

Figure 1:
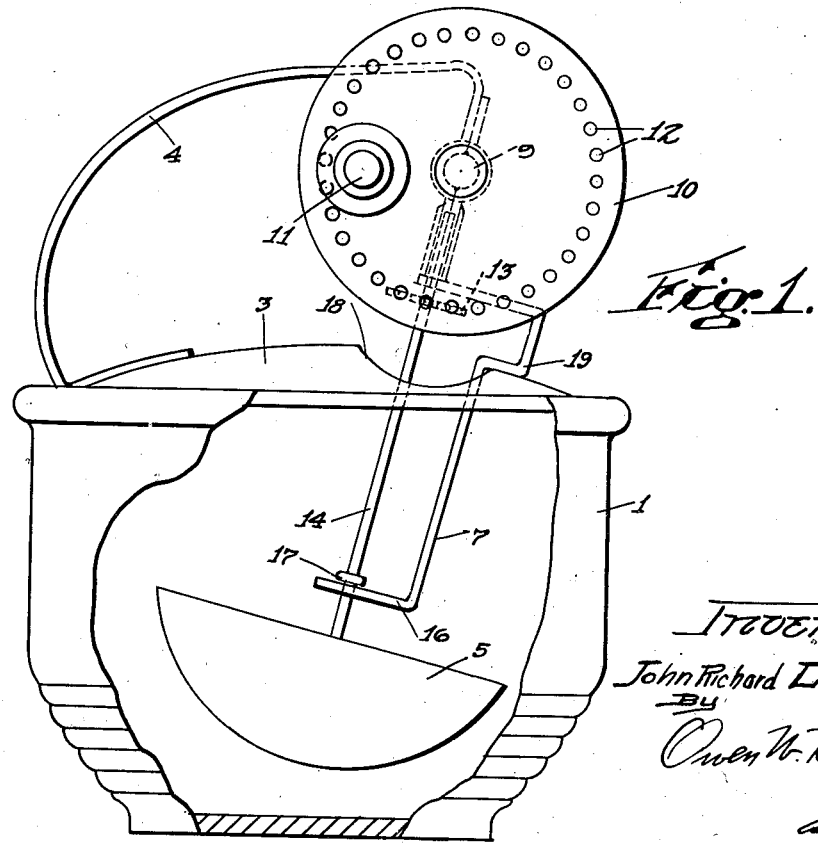
Fig. 1 is a side elevation of a device embodying the invention, with parts broken away.
Figure 3:
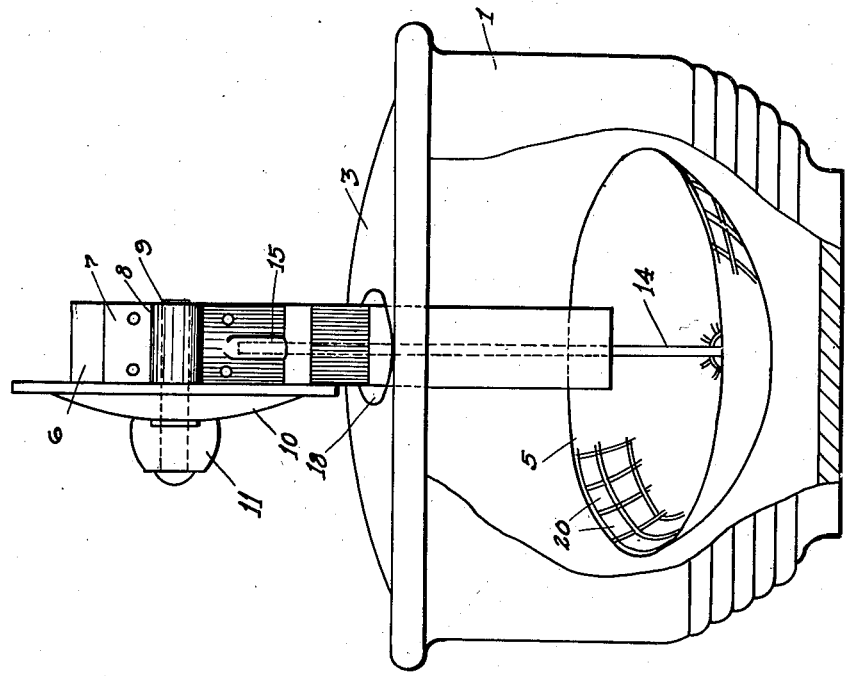
Fig. 3 is an end elevation of the device of Fig. 1, with parts broken away.
Figure 4:
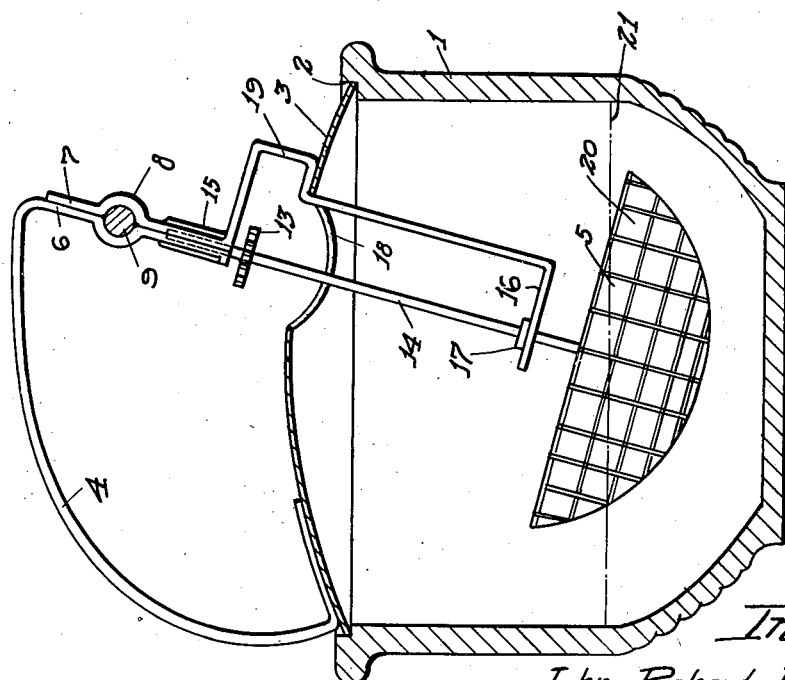
Fig. 4 is a sectional view substantially along the line 4—4 of Fig. 2, looking in the direction of the arrows.

As best shown in Figs. 1 and 4, the shaft 14 is supported by the member 7 and handle 4 so that it extends downwardly into the bowl at an angle such that the beater element rotates on an axis inclined a few degrees from the vertical. It has been found that, when the beater element is mounted and rotated in this way, a much more rapid, thorough and complete mixing and beating of the material in the bowl is effected. For most satisfactory operation, especially when the device is used for whipping cream, the level of the cream in the bowl is preferably approximately that indicated by the dot-dash line 21, Fig. 4, so that a portion of the periphery of the cup-shaped beater element projects above the level of the liquid.

I claim:

1. A beater construction, comprising in combination a bowl providing an open rim, a cover for said bowl fitting its rim and providing an opening, a handle attached at one end to said cover near its rim, with said handle extending upwardly over said cover to a point above said cover opening and then downwardly through said opening into said bowl to an extent determined by an abutment on said handle engaging an edge of said cover opening, a shaft rotatably supported above and below said cover by said downwardly extending handle portion, a second shaft rotatably supported by said handle above said abutment, gearing connecting said shafts above said cover, and a beater element mounted at the lower end of said first shaft, with said cover, handle, shafts, gearing and beater element being removable, as a unit, from said bowl.

2. A beater construction, comprising in combination a bowl providing an open rim of circular form, a removable cover for said bowl fitting its rim and providing an opening offset from the center thereof, a handle attached at one end to said cover near its rim, with said handle extending upwardly over said cover to a point above said cover opening, and then downwardly through said opening into said bowl to an extent determined by an abutment on said handle engaging the edge of said cover opening, a shaft rotatably supported above and below said cover by said downwardly extending handle portion, with the axis of said shaft inclined with respect to the vertical axis of said bowl, a second shaft rotatably supported by said handle above said abutment, gearing connecting said shafts above said cover, and a beater element mounted at the lower end of said inclined shaft.

3. A beater construction, comprising in combination a bowl providing an open rim of circular form, a removable cover for said bowl fitting its rim and providing an opening offset from the center thereof, a handle attached at one end to said cover near its rim, with said handle extending upwardly over said cover to a point above said cover opening, and then downwardly through said opening into said bowl to an extent determined by an abutment on said handle engaging the edge of said cover opening, a shaft rotatably supported above and below said cover by said downwardly extending handle portion, with the axis of said shaft inclined with respect to the vertical axis of said bowl, a second shaft rotatably supported by said handle above said abutment, gearing connecting said shafts above said cover, and a beater element mounted at the lower end of said inclined shaft, with the abutment on said handle serving, by its engagement with the cover, to maintain the beater a predetermined distance above the bottom of the bowl.

4. A beater construction, comprising in combination a bowl providing an open rim of circular form, a removable cover for said bowl fitting its rim and providing an opening offset from the center thereof, a handle attached at one end to said cover near its rim, with said handle extending upwardly over said cover to a point above said cover opening, and then downwardly through said opening into said bowl to an extent determined by an abutment on said handle engaging the edge of said cover opening, a shaft rotatably supported above and below said cover by said downwardly extending handle portion, with the axis of said shaft inclined with respect to the vertical axis of said bowl, a second shaft rotatably supported by said handle above said abutment, gearing connecting said shafts above said cover, and a beater element mounted at the lower end of said inclined shaft, with said beater being cup-shaped in form, and having a smoothly curved surface, so that a portion of the continuous periphery of said element is always travelling at a higher level than the remainder thereof, as the beater rotates about the inclined axis of said shaft.

JOHN RICHARD LAWRENCE.